United States Patent
Deprun et al.

(10) Patent No.: US 9,756,556 B2
(45) Date of Patent: Sep. 5, 2017

(54) METHOD FOR A DEVICE TO COMMUNICATE WITH ANOTHER DEVICE

(75) Inventors: Jean-Francois Deprun, Paris (FR); Younsung Chu, Gyeonggi-Do (KR); Jihye Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 779 days.

(21) Appl. No.: 13/702,187

(22) PCT Filed: Jun. 3, 2011

(86) PCT No.: PCT/KR2011/004097
§ 371 (c)(1),
(2), (4) Date: Dec. 5, 2012

(87) PCT Pub. No.: WO2011/155732
PCT Pub. Date: Dec. 15, 2011

(65) Prior Publication Data
US 2013/0086220 A1 Apr. 4, 2013

Related U.S. Application Data

(60) Provisional application No. 61/351,918, filed on Jun. 6, 2010, provisional application No. 61/352,800, filed
(Continued)

(51) Int. Cl.
*H04L 29/06* (2006.01)
*H04W 48/16* (2009.01)
(Continued)

(52) U.S. Cl.
CPC ......... *H04W 48/16* (2013.01); *H04L 41/0813* (2013.01); *H04L 65/102* (2013.01);
(Continued)

(58) Field of Classification Search
CPC ..... H04W 48/16; H04W 48/04; H04W 4/021; H04W 4/008; H04W 88/06; H04W 88/16; H04L 41/0813; H04L 65/102
See application file for complete search history.

(56) References Cited

U.S. PATENT DOCUMENTS 6,744,740 B2 6/2004 Chen
6,965,575 B2 11/2005 Srikrishna et al.
(Continued)

FOREIGN PATENT DOCUMENTS

KR 10-2010-0020925 A 2/2010
KR 10-2010-0050614 A 5/2010
(Continued)

OTHER PUBLICATIONS

Open Mobile Alliance, Converged Personal Network Service Requirements—Nov. 2009, Version 1.0-17, p. 10, 11 and 26.*
(Continued)

*Primary Examiner* — Chris Parry
*Assistant Examiner* — Soe M Hlaing
(74) *Attorney, Agent, or Firm* — Morgan, Lewis & Bockius LLP

(57) ABSTRACT

One embodiment of the present invention provides a method for communicating with another device using a first device having a converged personal network service (CPNS) enabled entity. The communication method comprises: a step for determining whether the mode of the CPNS enabled entity needs to be changed from gateway mode to coupling mode; and a step for changing the mode of the CPNS enabled entity from the gateway mode to the coupling mode, according to the results from the step for determining. When changed to the coupling mode, the CPNS enabled entity operates in personal network entity (PNE) mode to receive from the second device data for service of a second network,
(Continued)

and the gateway mode to transmit the received service data to at least one of the entities that belong to a first network managed by the CPNS enabled entity. The communication method can include a step for controlling the synchronism of the CPNS enabled entity operating in the gateway mode and at least one of the entities, considering the synchronism of the CPNS enabled entity operating in the PNE mode and the second device.

15 Claims, 11 Drawing Sheets

Related U.S. Application Data on Jun. 8, 2010, provisional application No. 61/353,634, filed on Jun. 10, 2010, provisional application No. 61/353,667, filed on Jun. 11, 2010, provisional application No. 61/373,863, filed on Aug. 15, 2010, provisional application No. 61/377,910, filed on Aug. 27, 2010, provisional application No. 61/382,901, filed on Sep. 14, 2010, provisional application No. 61/386,954, filed on Sep. 27, 2010, provisional application No. 61/412,396, filed on Nov. 11, 2010, provisional application No. 61/416,301, filed on Nov. 23, 2010, provisional application No. 61/417,464, filed on Nov. 29, 2010, provisional application No. 61/419,877, filed on Dec. 6, 2010.

(51) Int. Cl.
| | | |
|---|---|---|
| *H04L 12/24* | (2006.01) | |
| *H04W 88/06* | (2009.01) | |
| *H04W 4/00* | (2009.01) | |
| *H04W 4/02* | (2009.01) | |
| *H04W 48/04* | (2009.01) | |
| *H04W 88/16* | (2009.01) | |

(52) U.S. Cl.
CPC .......... *H04W 4/008* (2013.01); *H04W 4/021* (2013.01); *H04W 48/04* (2013.01); *H04W 88/06* (2013.01); *H04W 88/16* (2013.01)

(56) References Cited

U.S. PATENT DOCUMENTS

| | | | |
|---|---|---|---|
| 8,751,617 | B2 | 6/2014 | Claes et al. |
| 9,001,762 | B2 | 4/2015 | Chu et al. |
| 2002/0146981 | A1* | 10/2002 | Saint-Hilaire et al. ............... 8/5 |
| 2002/0181443 | A1 | 12/2002 | Coffey et al. |
| 2007/0171878 | A1 | 7/2007 | Souissi et al. |
| 2009/0141653 | A1 | 6/2009 | McNeill et al. |
| 2009/0147702 | A1 | 6/2009 | Buddhikot et al. |
| 2009/0238099 | A1 | 9/2009 | Ahmavaara |
| 2009/0285126 | A1 | 11/2009 | Lu et al. |
| 2010/0008275 | A1* | 1/2010 | Lee et al. ............................ 3/658 |
| 2010/0040032 | A1 | 2/2010 | Jeon et al. |
| 2011/0026436 | A1 | 2/2011 | Karaoguz et al. |
| 2011/0026477 | A1 | 2/2011 | Sinivaara et al. |
| 2011/0183760 | A1 | 7/2011 | Kim et al. |
| 2012/0287822 | A1 | 11/2012 | Jeon et al. |
| 2013/0077531 | A1 | 3/2013 | Chu et al. |
| 2015/0201372 | A1 | 7/2015 | Chu et al. |

FOREIGN PATENT DOCUMENTS

| | | |
|---|---|---|
| KR | 10-2010-0050620 A | 5/2010 |
| WO | 2009-120666 A1 | 10/2009 |

OTHER PUBLICATIONS

Search Report issued in corresponding International Application No. PCT/KR2011/004097 dated Dec. 13, 2011.

Search Report issued in corresponding International Application No. PCT/KR2011/004098 dated Feb. 10, 2012.

* cited by examiner

METHOD FOR A DEVICE TO COMMUNICATE WITH ANOTHER DEVICE

This is a U.S. National Phase Entry of PCT Application No. PCT/KR2011/004097, filed Jun. 3, 2011, and claims the benefit of US Provisional Application Nos. 61/419,877 filed Dec. 6, 2010; 61/417,464 filed Nov. 29, 2010; 61/416,301 filed Nov. 23, 2010; 61/412,396 filed Nov. 11, 2010; 61/386,954 filed Sep. 27, 2010; 61/382,901 filed Sep. 14, 2010; 61/377,910 filed Aug. 27, 2010; 61/373,863 filed Aug. 15, 2010; 61/353,667 filed Jun. 11, 2010; 61/353,634 filed Jun. 10, 2010; 61/352,800 filed Jun. 8, 2010; and 61/351,918 filed Jun. 6, 2010.

TECHNICAL FIELD

The present invention relates to a Converged Personal Network Service (CPNS).

BACKGROUND ART

Among various technologies, technologies such as Digital Living Network Alliance (DLNA) or ZigBee are mainly used to discover services of devices within a specific Personal Area Network (PAN) and tethering technology is mainly used to connect heterogeneous networks.

Unlike such a simple PAN, a CPNS has been proposed.

The CPNS allows devices belonging to a personal network (PN) (or a PAN) to receive various services.

Such a CPNS is implemented through a CPNS server, a CPNS gateway and a device supporting a CPNS. In addition, general servers or general devices may also be included.

In the CPNS, a set of devices is referred to as a PN, the CPNS gateway is placed in the PN, services of devices belong to the PN are registered with the CPNS server, a device for providing a predetermined service is discovered in the CPNS server, and an external entity is allowed to share the service provided by the device based on discovery.

The CPNS gateway (also referred to a PN gateway (GW)) serves to connect the PN to another network. The CPNS device is referred to as a personal network entity (PNE) and becomes a member configuring the PN. Several devices may be grouped into a PNE or one device may become a PNE.

FIG. 1 shows the concept of the CPNS.

As shown in FIG. 1, general servers, CPNS servers, CPNS gateways, CPNS devices and general devices are shown.

The CPNS servers may communicate with one or more CPNS gateways (that is, PN gateways) to transmit and receive data. The CPNS servers may communicate with one or more CPNS devices in the PN (or PAN) through the CPNS gateways to exchange data.

The CPNS devices may transmit and receive data to and from one or more different CPNS devices or general devices through the CPNS gateways.

The CPNS gateways may communicate with the CPNS servers or CPNS gateways belonging to another PN or the CPNS devices to transmit and receive data.

The CPNS servers may communicate with the general servers and the CPNS gateways to transmit and receive data.

For example, the CPNS servers and the CPNS gateways may communicate with each other using a cellular network and the CPNS servers and the CPNS devices may communicate with each other using short-range communication such as Bluetooth, near field communication (NFC), ZigBee, Wi-Fi, etc.

The CPNS servers manage and control communication between the CPNS gateways and the CPNS devices so as to exchange applications and information, thereby enhancing user experience. For example, in FIG. 1, a user may acquire position information from another CPNS device (e.g., a global positioning system (GPS)) using an arbitrary CPNS device, transmit the position information to a CPNS server through a CPNS gateway, and receive a position based service from the CPNS server.

As a result, the user may receive various services through several CPNS devices belonging to the PN.

DISCLOSURE

Technical Problem

In the related art, only the concept of a CPNS has been proposed and technologies necessary for implementing the CPNS have not been proposed.

An object of the present invention is to provide technology for implementing a CPNS.

Technical Solution

The object of the present invention can be achieved by providing a method of communicating with a second device at a first device including a converged personal network service (CPNS) enabled entity.

The method includes determining whether a mode of the CPNS enabled entity needs to be changed from a gateway mode to a combined mode and changing the mode of the CPNS enabled entity from the gateway mode to the combined mode according to the result of determining. The CPNS enabled entity operates in a personal network entity (PNE) mode to receive service data of a second network from the second device and the CPNS enabled entity operates in the gateway mode to transmit the received service data to at least one entity belonging to a first network managed by the CPNS enabled entity, according to change to the combined mode. The method further includes controlling synchronization between the CPNS enabled entity operating in the gateway mode and the at least one entity, in consideration of synchronization between the CPNS enabled entity operating in the PNE mode and the second device.

The method may further include comparing an offset between a start point of a frame received from the second device and a start point of a frame transmitted by the CPNS enabled entity.

The method may further include comparing an idle time in a link with the second device and an idle time in a link with at least one entity. The controlling synchronization may be performed if the idle times mismatch.

The method may further include comparing an offset time between a signal received on a link with the second device and a signal transmitted and received on a link with the at least one entity and a wakeup time for receiving the signal on the link with the second device. The controlling synchronization is performed if the offset time is greater than the wakeup time.

The method may further include comparing a time a2+b1 and a time k, a2 is a wakeup time after receiving the signal on the link with the second device, b1 is a wakeup time before receiving the signal on the link with the at least one entity, and k is a time after the time a2 is completed and before the time b1 is started. The controlling synchronization may be performed if $a2+b1<k$.

A communication channel may be established with the CPNS enabled entity operating in the gateway mode in consideration of synchronization between the CPNS enabled entity operating in the PNE mode and the second device.

The determining may include determining whether at least one entity belonging to the first network managed by the CPNS enabled entity needs to receive a service of the second network from the second device but is outside a coverage of the second network or whether the at least one entity is within the coverage of the second network but cannot directly receive the service from the second device.

The determining may include determining that the mode is changed to the combined mode when the at least one entity is outside a coverage of the second network or is within the coverage of the second network but cannot directly receive a service of the second device.

The determining may include determining that the mode is not changed when all PNEs belonging to the first network are within a coverage of the second network and are available for receiving a service of the second network.

The determining may include determining that the mode is not changed when some of all PNEs belonging to the first network are not within a coverage of the second network but at least the remaining PNEs which will use a service of the second network among all the PNEs are within the coverage of the second network.

The method may further include receiving a discovery request message including information about the mode of the second device from the second device if the CPNS enabled entity set in the gateway mode is moved into a coverage of the second network managed by the second device. The method may further include transmitting a discovery response message in response to reception of the discovery request message. The discovery response message may include mode information indicating that the CPNS enabled entity operates in the combined mode.

In another aspect of the present invention, there is provided a device including a memory configured to store a converged personal network service (CPNS) enabled entity set in a gateway mode. The CPNS enabled entity set in the gateway mode manages a first network and at least one entity capable of receiving a first service through the CPNS enabled entity set in the gateway mode is present within the first network. The device may further include a controller configured to determine whether a mode of the CPNS enabled entity needs to be changed from the gateway mode to a combined mode, to operate both a gateway and a personal network entity (PNE) in order to change the mode of the CPNS enabled entity from the gateway mode to the combined mode according to the result of determining, and to control synchronization between the CPNS enabled entity operating in the gateway mode and the at least one entity, in consideration of synchronization between the CPNS enabled entity operating in the PNE mode and the second device. The device may further include a transceiver configured to receive service data of a second network from the second device using the PNE operated by the controller and transmitting the received service data to at least one entity belonging to the first network managed by the CPNS enabled entity using the operated gateway.

Advantageous Effects

The embodiment of the present invention solves the problems of the related art. The embodiment of the present invention proposes technology for implementing a CPNS.

BEST MODE

Figure 1:
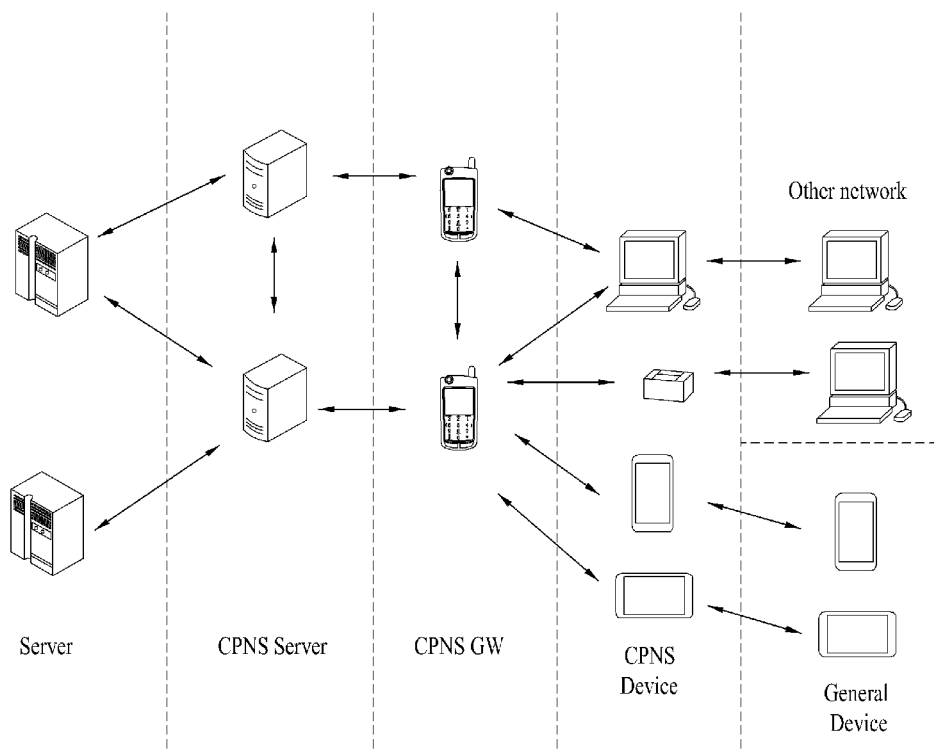
FIG. 1 is a diagram showing the concept of a CPNS.

The present invention relates to a converged personal network service (CPNS). However, the present invention is not limited thereto and is applicable to all communication systems and methods to which the technical spirit of the present invention is applicable.

Technical terms used in this specification are used merely to illustrate specific embodiments, and it should be understood that they are not intended to limit the present disclosure. So long as not defined otherwise, all terms used herein including technical terms may have the same meaning as those generally understood by an ordinary person skilled in the art to which the present disclosure belongs, and should not be construed in an excessively comprehensive manner or an excessively restricted manner. In addition, if a technical term used in the description of the present disclosure is an erroneous term that fails to clearly express the idea of the present disclosure, it should be replaced by a technical term that can be properly understood by those skilled in the art. In addition, general terms used in the description of the present disclosure should be construed according to definitions in dictionaries or according to the context, and should not be construed in an excessively restricted manner.

A singular representation may include a plural representation unless the context clearly indicates otherwise. It will be understood that the terms 'comprising', 'including', etc., when used in this specification, specify the presence of several components or several steps and part of the components or steps may not be included or additional components or steps may further be included.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

It will be understood that when an element is referred to as being "connected with" another element, the element can be directly connected with the other element or intervening elements may also be present. In contrast, when an element is referred to as being "directly connected with" another element, there are no intervening elements present.

Exemplary embodiments of the present invention will be described below in detail with reference to the accompanying drawings in which the same reference numbers are used throughout this specification to refer to the same or like parts. In describing the present invention, a detailed description of known functions and configurations will be omitted when it may obscure the subject matter of the present invention. The accompanying drawings are used to aid in easy understanding of the technical idea of the present invention and it should be understood that the idea of the present invention is not limited by the accompanying drawings. The idea of the present invention should be construed to extend to any alterations, equivalents and substitutions besides the accompanying drawings.

Although the term 'terminal' is illustrated in the drawings, the terminal may be called a User Equipment (UE), a Mobile Equipment (ME), a Mobile Station (MS), a User Terminal (UT), a Subscriber Station (SS), a wireless device, a handheld device, or an Access Terminal (AT). The terminal may be a type of portable equipment having a communication function, such as a cellular phone, a Personal Digital Assistant (PDA), a smart phone, a wireless modem, and a notebook, or may be a type of fixed equipment, such as a PC and a vehicle-mounted device.

Definition of Terms

Hereinafter, the terms used in the present invention will be briefly defined before describing the present invention with reference to the drawings.

1) CPNS (Converged Personal Network Service): The CPNS allows devices belonging to a personal network (PN) (or personal area network (PAN)) to receive several services. If such a CPNS is compared with a general tethering service, the tethering service refers to technology of, at a device connected to the Internet, allocating a private IP address to another device using network address translation (NAT) technology such that another device accesses the Internet using the private IP address. In contrast, in the CPNS, a first device of a user does not allocate a private IP address to another device but combines and manages several services which may be received through a mobile communication network. The first device of the user combines and manages several services such that a service is seamlessly shared between several devices of the user. For example, a video on demand (VOD) may be seamlessly transferred from the first device of the user to a second device. Accordingly, it is possible to increase user convenience. If a user possesses several devices and an external server delivers service data to the user without a user request, it is determined to which of the several devices the service data is transmitted. For example, if a user receives an incoming video call in a state in which the user possesses several devices supporting video communication, it is determined to which of the several devices the incoming video call is delivered. The video call is seamlessly delivered to another device of the user. The CPNS is achieved by a CPNS enabled entity included in the device of the user.

2) CPNS enabled entity: The CPNS enabled entity is a logical entity and includes three entities, that is, a PNE, a PN GW and a CPNS server. That is, the CPNS server entity is located within a core network and the PNE and the PN GW are located in the CPNS device.

3) CPNS device: The CPNS device can simultaneously operate in several modes within a personal network. The CPNS device may have a function for processing, storing and reproducing content. In addition, the CPNS device may have a communication interface for allowing other CPNS devices to operate in different modes within the personal network.

4) CPNS server: The CPNS server is a functional entity for providing resources to CPNS entities in response to a request or using a push method. The CPNS server registers a device and user associated service, stores information, provides registration of a PN which is a set of devices and a service group including a PN and a WAN. In addition, the CPNS server may communicate with external entities such as a content provision server. The CPNS server is an entity for setting a key for authenticating a device possessed by a user in order to perform a service on a CPNS framework. The CPNS server registers a service provided by an external entity and supports a discovery and consumption/provision request such that a device consumes the service.

5) Personal Network (PN): The PN is a set of devices for allowing a user to consume and generate a service. All devices within the PN may be connected to a PN GW. The PN may vary with time. The PN may include at least a device which operates in a GW mode and another device which operates as a personal network element (PNE).

6) PNE: This is an abbreviation for a personal network element and is a member configuring a PN. The PNE may consume or provide a service or content. The PNE consumes actual content, applications or services. The PNE is a member configuring a service group or a PN within a CPNS framework.

7) PN GW: This is an abbreviation for personal network gateway, is an entity which is present in a PN and a wide area network, and may generate a PN for providing a CPNS service. In addition, the PN GW serves to connect a device which cannot be connected to an external device to a heterogeneous network while present in the PN and manages inventory and registration of connected devices with the CPNS server.

The PN GW in the device allows a PNE present in the PN and another device to be connected to the CPNS server. The PN GW present in the device uses a global network such as a mobile network. In addition, the PN GW manages services of PNEs and manages communication and a variety of other functional information.

8) PN Inventory: This is a list of devices belonging to a PN and several PNs.

9) Service group: This is a set of PNEs and PN GWs which share services, data and applications. This means a set of devices registered with a server via a generated PN. At this time, all devices which are members of the service group do not need to depend on one PN, include all devices which belong to several PNs, are distant from one another and are not connected to each other, and may not be owned by the same user.

10) Zone: This is a specific region.

11) Zone based service: This means a CPNS server provided within a coverage of a zone based PN GW.

12) Zone PN GW: This is a PN GW for providing a unique service or content in a zone.

13) Mode of CPNS enabled entity: The CPNS device may operate in a PN GW or PNE mode. The mode may be confirmed between devices through a CPNS entity discovery function. The PN should include at least a device which operates as a PN GW and a device which operates as a PNE. The PNE and the PN GW should know mutual modes in order to generate a PN and participate in the PN. The PN GW should identify the PNE in order to configure a member of a PNE. In addition, the PNE should know a PN GW in order to newly generate a PN or participate in a previously generated PN.

If there is a device (e.g., an MP3 player, a smart meter, etc.) supporting only a PNE mode, the device operates only in the PNE mode. If a certain device may operate only as a PN GW, the device operates as the PN GW. However, if a certain device operates as any one of a PN GW and a PNE, the device may operate as any one of the PN GW and the PNE according to a predetermined setting value and may be changed according to user settings or provider settings.

Figure 2:
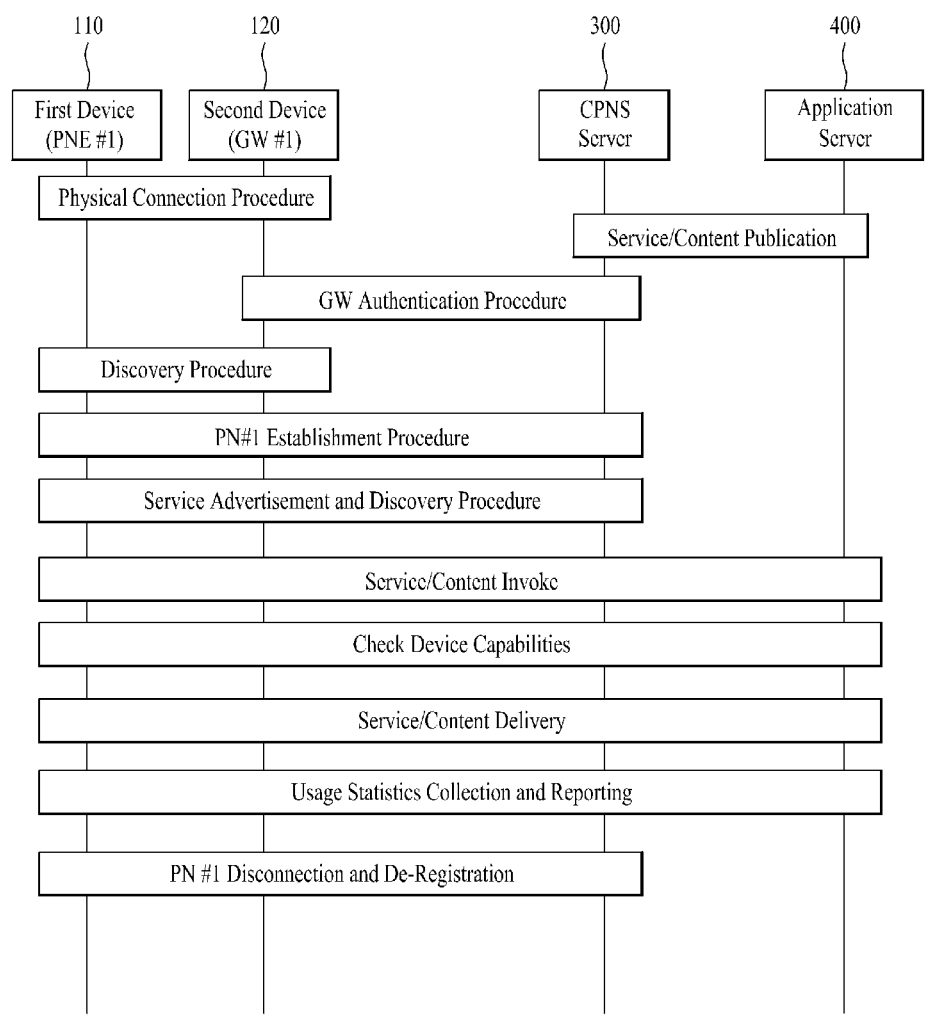
FIG. 2 is diagram showing the overall procedure of a CPNS.

FIG. 2 is diagram showing the overall procedure of a CPNS.

Referring to FIG. 2, a first device 110, a second device 120, a CPNS server 300 and an application server 400 are shown.

The first and second devices 110 and 120 are possessed by a user A. The first device 100 is a cellular phone of the user A and may include a first transceiver for connection with the CPNS server 300 via a mobile communication network. In addition, the first device 110 may include a second transceiver, such as a Bluetooth, Wi-Fi or ZigBee transceiver, for establish a personal network. The second device 120 is a portable multimedia device of the user A, does not have a first transceiver for performing communication with a mobile communication network, but has a second transceiver, such as a Bluetooth, Wi-Fi or ZigBee transceiver, for establishing a personal network.

The first and second devices 110 and 120 may include CPNS enabled entities. Each CPNS enabled entity may operate in a gateway or PNE mode. In FIG. 2, the second device 120 includes the first transceiver which may be connected through the mobile communication network and thus operates in the gateway mode.

If the first device 110 and the second device 120 are distant from one another, a physical connection procedure is performed through the second transceiver. The application server 400 registers and advertises a service and content with and to the CPNS server 300. The CPNS server 300 performs a procedure of authenticating the second device 120 which operates as the gateway.

If the physical connection procedure of the first device 110 and the second device 120 is completed, CPNS enable entities discover one another.

Once discovery is completed, the devices set PN#1. At this time, information about PN#1 is registered with the CPNS server 300.

If PN# is completely set up, the CPNS server 300 advertises a service thereof to devices in PN#1 or discovers services provided by the devices in PN#1.

If an arbitrary device in PN#1 invokes an arbitrary service or content among the advertised services, a process of confirming the function of the arbitrary device is performed and the service or content is delivered according to the confirmed function.

If the arbitrary device uses the service or content, statistics about use of the service or content are gathered and reported to the CPNS server 300 or the application server 400.

If PN#1 is no longer necessary, PN#1 is released and information about PN#1 is deregistered from the CPNS server 300.

Figure 3:
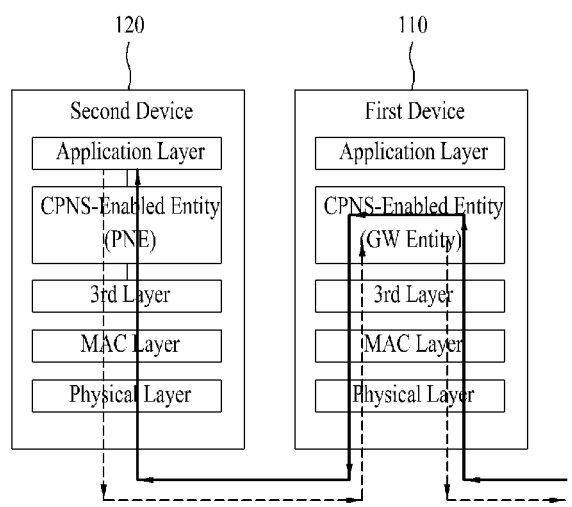
FIG. 3 is a diagram showing architecture of first and second devices shown in FIG. 2.

FIG. 3 is a diagram showing architecture of the first and second devices shown in FIG. 2.

Referring to FIG. 3, a physical layer, a media access control (MAC) layer, a third layer and a CPNS enabled entity and an application layer are present in each of the first and second devices 110 and 120. At this time, the CPNS enabled entity of the second device 120 operates in the PNE mode and the CPNS enabled entity of the first device 110 drives only the GW entity.

Accordingly, as denoted by a thick solid line of FIG. 3, service data is delivered to the gateway entity of the CPNS enabled entity through the physical layer, the MAC layer and the third layer of the first device 110. When the gateway entity of the first device 110 receives the service data, the service data is delivered to the second device 120 through the CPNS enabled entity, the third layer, the MAC layer and the physical layer.

In the second device 120, the PNE of the CPNS enabled entity receives the service data through the physical layer, the MAC layer and the third layer.

The PNE of the CPNS enabled entity of the second device 120 transmits a control message such as a request message or a response message to the first device 110 through the third layer, the MAC layer and the physical layer.

Figure 4:
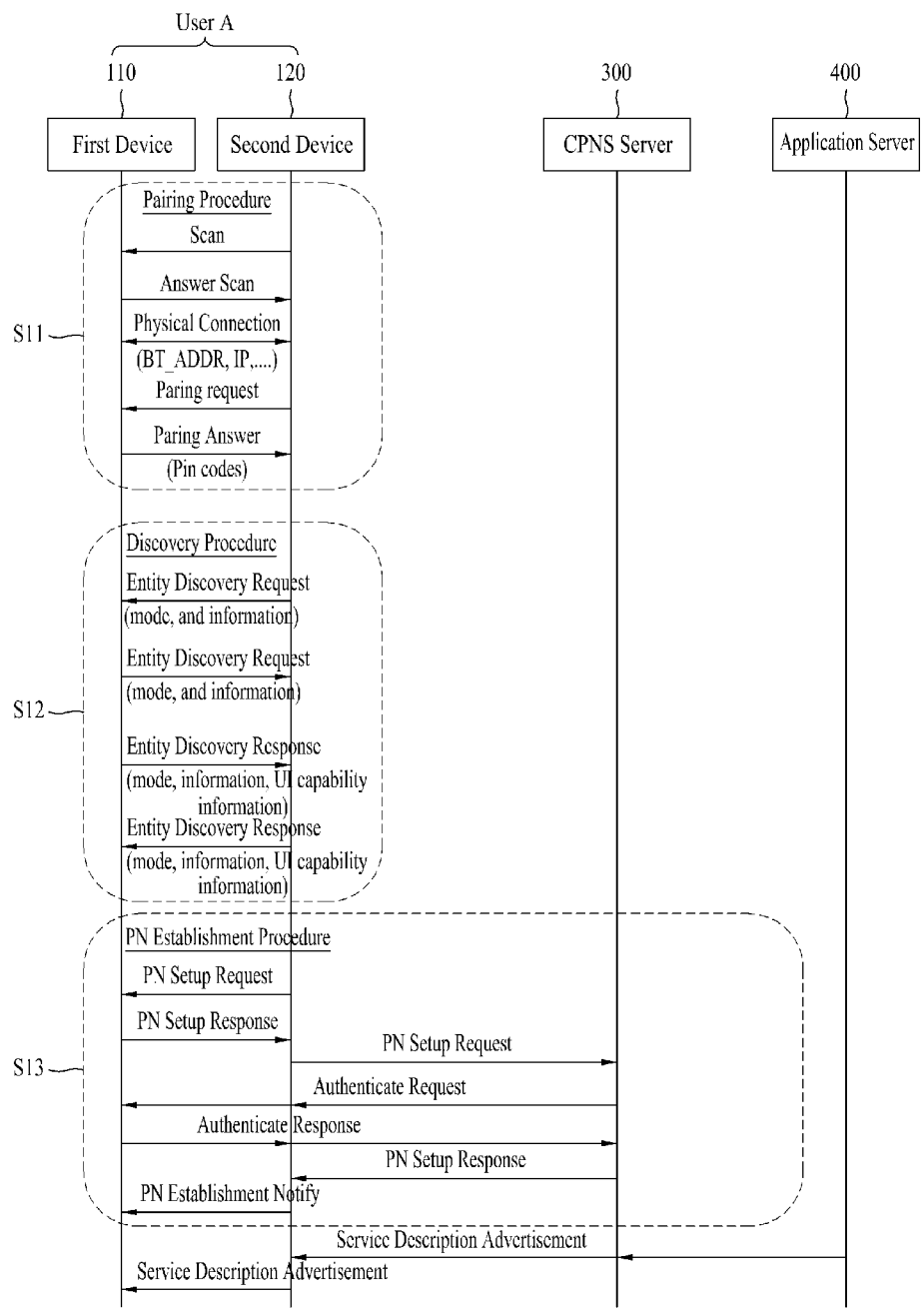
FIG. 4 is a diagram showing an initial procedure of a CPNS.

FIG. 4 is a diagram showing an initial procedure of a CPNS.

Referring to FIG. 4, a pairing procedure corresponding to a physical connection procedure S11, an entity discovery procedure S12 and a PN establishment procedure S13 are performed.

First, the pairing procedure S11 will be described. A physical connection is established between the shown devices in a state in which devices of a user A are not connected.

For physical connection, the second device 120 begins to perform a scanning operation. For scanning, the second device may transmit a scan message to the first device 100. The first device 110 transmits a scan answer message to the second device 120 in response to the scan message. Then, a physical connection procedure begins to be performed between the first device and the second device and physical connection information, e.g., information such as an address or an IP address is exchanged. If the information is exchanged, the second device transmits a physical connection request message, e.g., a pairing request message to the first device. The first device receives pin codes from the user, includes the pin codes in the connection request answer message, e.g., a pairing answer message, and transmits the pairing answer message to the second device. If the pin codes are accurate, the physical connection procedure is completed.

If the physical connection procedure is completed, the CPNS enabled entity of each device performs a discovery procedure, that is, an entity discovery procedure (S12).

More specifically, first, the CPNS enabled entity of the second device 120 transmits a discovery request message, e.g., an entity discovery request message, to the first device 110. The discovery request message, for example, the entity discovery request message, includes information about the mode of the CPNS enabled entity of the second device and information about the CPNS enabled entity and other devices which have been previously discovered. At this time, if the CPNS enabled entity of the second device is set to a gateway, the mode information may include information indicating that the CPNS enabled entity is a gateway.

The CPNS enabled entity of the first device 110 also transmits a discovery request message, e.g., an entity discovery request message, to the second device 120. Similarly, the discovery request message, for example, the entity discovery request message, includes information about the mode of the CPNS enabled entity of the first device 110 and information about the CPNS enabled entity and other devices which have been previously discovered. At this time, if the CPNS enabled entity of the second device is set to a PNE, the mode information may include information indicating that the CPNS enabled entity is a PNE.

The CPNS entity of the first device 110 transmits a discovery response message, e.g., an entity discovery response message, to the second device 120 in response to reception of the discovery request message from the second device. The discovery response message, e.g., the entity discovery response message, includes mode information, information about the CPNS enabled entity and other devices which have been previously discovered, and information about a UI function.

Similarly, the CPNS entity of the second device 120 transmits a discovery response message, e.g., an entity discovery response message, to the first device 110 in response to reception of the discovery request message from the first device.

If the discovery procedure has been completed, the PN establishment procedure S13 is performed.

More specifically, if the CPNS enabled entity of the second device 120 is set to a gateway, for example, a PN setup request message is transmitted to a device set to a PNE, e.g., the first device 110. At this time, the PN setup message may include information about the gateway and information about entities (e.g., the CPNS enabled entity of the first device) which will belong to a PN to be generated.

If the CPNS enabled entity of the first device transmits, for example, a PN setup response message to the second device, the CPNS enabled entity of the second device 120 transmits the PN setup request message to the CPNS server 300.

The CPNS server 300 receives the PN setup request message and transmits an authentication request message to the first device through the second device 120 which operates as the gateway. The first device transmits an authentication response message to the CPNS server 300 through the second device, which operates as the gateway, in response to the authentication request message.

Then, the CPNS server 300 receives the authentication response message and transmits a PN setup response message to the second device 120 which operates as the gateway.

Then, the CPNS enabled entity of the second device 120 which operates as the gateway transmits a PN establishment notification message to the first device.

If PN establishment is completed by transmitting and receiving the above-described messages, for example, the application server 400 such as a content server may transmit a service description advertisement message including information about the service thereof to the second device which is the gateway through the CPNS server 300. Then, the second device 120 which is the gateway transmits the service description advertisement message to devices belonging to the PN managed by the second device.

Figure 5:
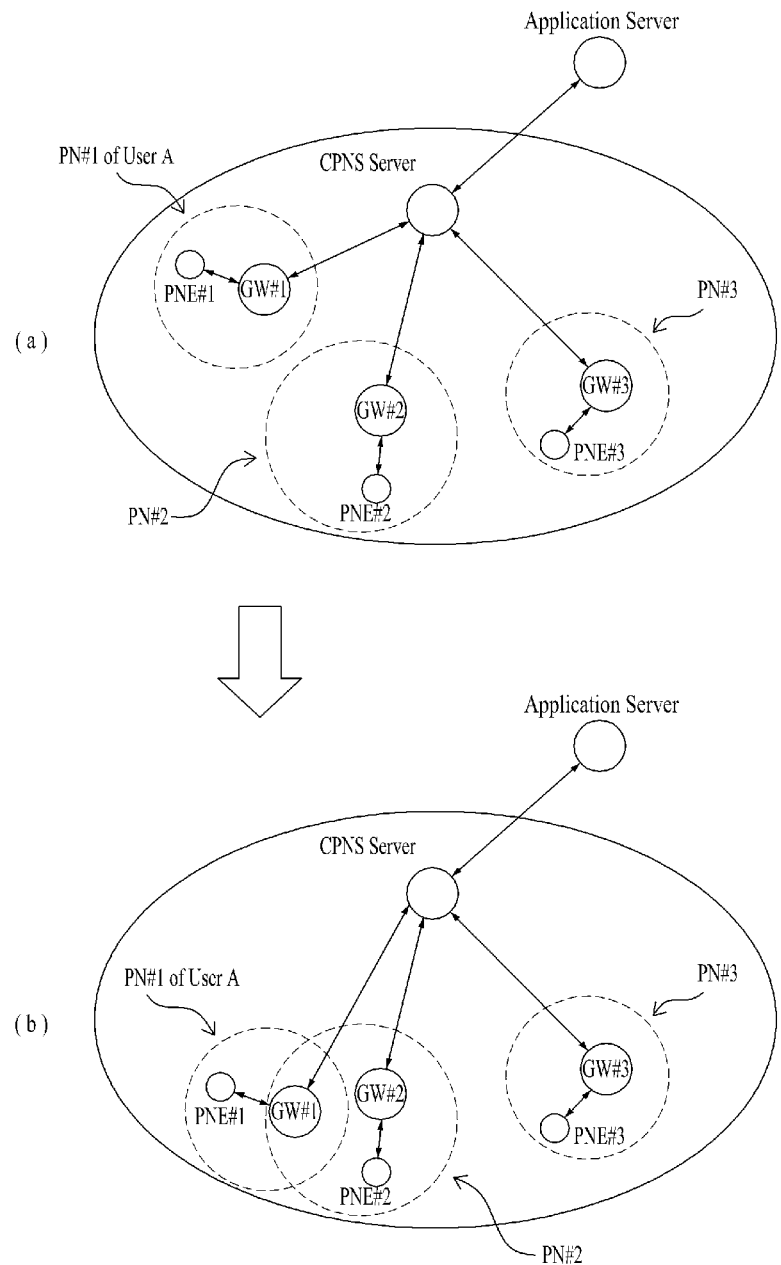
FIG. 5 is a diagram showing an example in which a user A geographically moves such that a PN of the user overlaps another PN.

FIG. 5 is a diagram showing an example in which a user A geographically moves such that a PN of the user overlaps another PN.

First, FIG. 5(*a*) shows three PNs, a CPNS server and an application server. PN#1 of the three PNs is generated by the user A. PN#1 includes the devices of the user A and may include, for example, GW#1 and PNE#1 as shown. At this time, assume that GW#1 is a cellular phone of the user A and PNE#1 is a portable multimedia device of the user A. PN#2 includes GW#2 and PNE#2 and PN#3 includes GW#3 and PNE#3. The application server may provide a service to the PNEs of each PN through the CPNS server and GW#1, GW#2 and GW#3.

As shown in FIG. 5(*b*), assume that the user A geographically moves into the coverage of PN#2 in a state of carrying GW#1.

Then, PN#1 including GW#1 of the user A and PN#2 overlap each other. That is, GW#1 and PNE#2 of the user A are within the coverage of PN#2. At this time, PNE#1 moves according to the movement of the user A so as to be within the coverage of PN#2. However, although PNE#1 is within the coverage of PN#2, connection with GW#2 in PN#2 may be impossible due to lack of power, power off or communication method mismatch with PN#2. Alternatively, if the user gets off a car in a state of carrying only GW#1 and leaving PNE#1 in the car, PNE#1 may be located outside the coverage of PN#2.

If PNE#1 cannot be connected to GW#2 in PN#2 for various reasons, the user A cannot receive a service from GW#2 in PN#1.

Accordingly, GW#1 of the user A is a gateway and thus operates as a PNE in order to receive a service. Accordingly, hereinafter, procedures of changing the mode GW#1 from a gateway mode to another mode are proposed.

Figure 6:
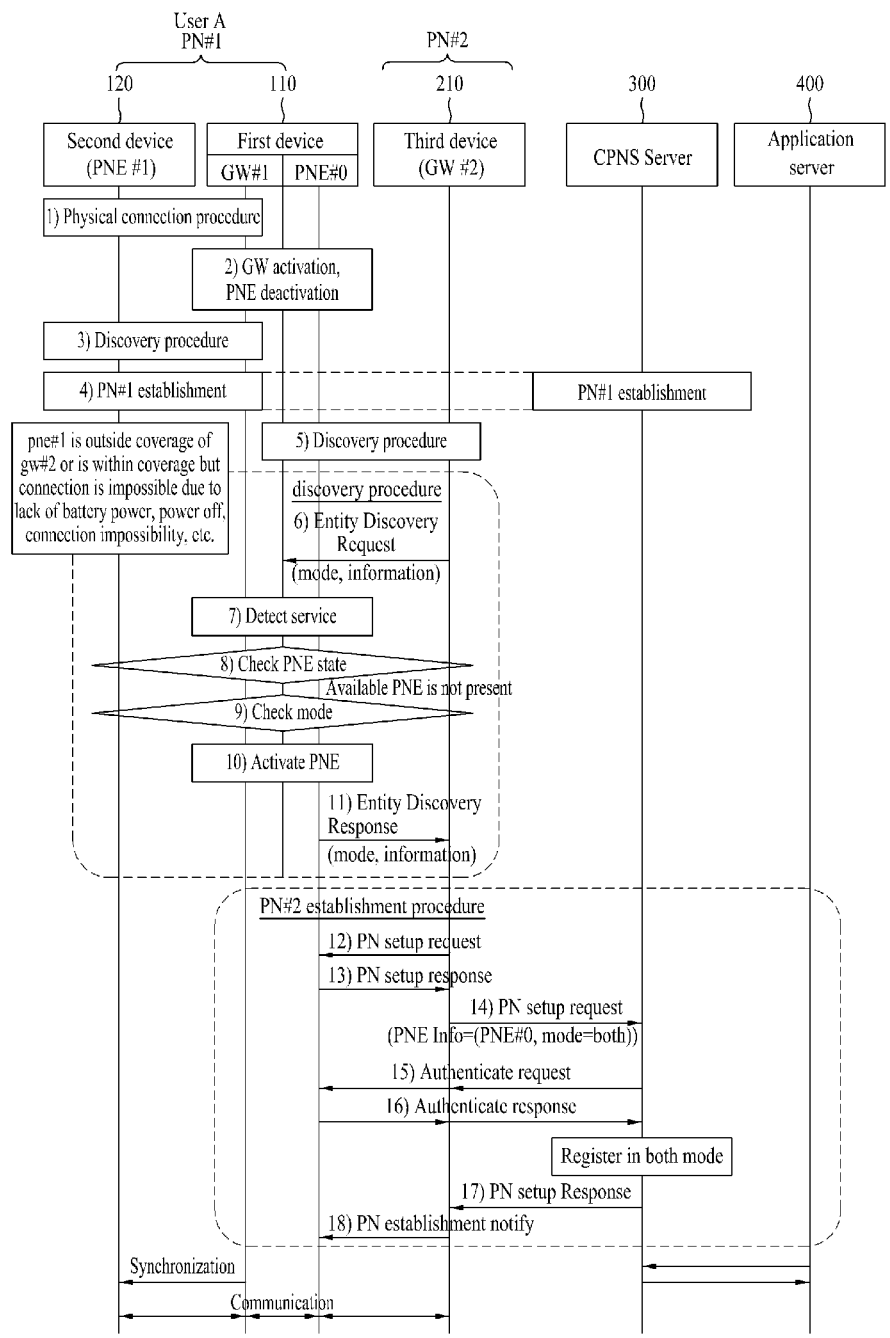
FIG. 6 is a signal flow diagram of a process of changing a mode of a CPNS enabled entity.
Figure 7:
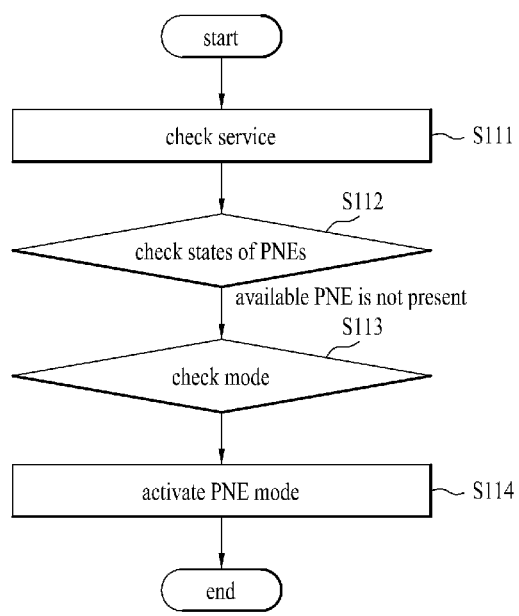
FIG. 7 is a flowchart illustrating a process of changing a mode of a CPNS enabled entity.

FIG. 6 is a signal flow diagram of a process of changing a mode of a CPNS enabled entity. FIG. 7 is a flowchart illustrating a process of changing a mode of a CPNS enabled entity.

Referring to FIG. 6, a first embodiment shows a process of changing the mode of the CPNS enabled entity of the first device 120 from a gateway mode to another mode.

More specifically, referring to FIG. 6, the user A possesses a first device 10 which operates as a gateway and a second device 120 which operates as a PNE. Assume that the first device 110 is a cellular phone and the second device 120 is a portable multimedia device.

1-4) If the first device 110 and the second device 120 are located a short distance apart, a physical connection procedure is performed. The CPNS enabled entity of the first device 110 reads a mode setting value thereof, activates a gateway entity according to the mode setting value, and deactivates a PNE. Similarly, the CPNS enabled entity of the second device 120 reads a mode setting value thereof, activates a PNE according to the mode setting value, and deactivates a gateway entity. Subsequently, a mutual discovery procedure is performed between the first device 110 and the second device 120. The CPNS enabled entity of the first device 110 performs a PN establishment procedure to generate PN#1.

5) Assume that the user A geographically moves into the coverage of PN#2 in a state of carrying the first device 110. At this time, the second device may be located outside the coverage of PN#2 or communication may be impossible in PN#2 due to lack of power, power off or communication method mismatch although the second device is within the coverage of PN#2.

Then, the user A performs physical connection between the first device 110 and the third device 210.

6) If the mode of the CPNS enabled entity of the third device 210 is set to a gateway, just after physical connection is completed, for example, a discovery request message is transmitted. At this time, if the CPNS enabled entity of the third device 210 does not first transmit information but the third device 210 and the first device 110 simultaneously transmit information, information may overlap. In order to prevent information from overlapping, the third device 210 which operates as the gateway first transmits the discovery request message just after physical connection is completed.

The discovery request message may include the following elements.

EntityInfo element: This includes information about the CPNS enabled entity for transmitting the discovery request message.

UserInfo element: This includes information about the user of the CPNS enabled entity for transmitting the discovery request message. The information about the user may include a user ID sub element and a user name sub element.

PNEID element (or attribute): This is the ID of the PNE if the CPNS enabled entity for transmitting the discovery request message is a PNE.

PN GW ID element (or attribute): This is the ID of the GW if the CPNS enabled entity for transmitting the discovery request message is a PN GW.

PNE name or PN GW name element: This is the name of the PNE if the CPNS enabled entity for transmitting the discovery request message is a PNE and the name of the GW if the CPNS enabled entity for transmitting the discovery request message is a PN GW.

Mode element (or attribute): This is information about the active mode of the CPNS enabled entity for transmitting the discovery request message and has a value representing a PNE or a PN GW. This has a value of 1 if the active mode of the CPNS enabled entity is a PNE mode and has a value of 2 if the active mode is a PN GW mode. In FIG. 6, since the CPNS enabled entity of the third device is set to a gateway, this has a value of 2.

PN Info Req element (or attribute): This has True or False. If the CPNS enabled entity for transmitting the discovery request message wishes to acquire information about the PN stored by the entity which will receive the discovery request message, True is included.

UI Capabilities (or attribute): This has True if the PN GW should perform user interaction instead of the PNE. This is set by the PNE. For example, this may be set to true if the PNE does not have a user interface and thus the PN GW performs user interaction instead.

Zone based service support element (or attribute): This is set to "TRUE" if the PN GW may provide a zone based service.

PN Info element: If the CPNS enabled entity for transmitting the discovery request message is a PN GW, a PN ID sub element, a PNE Info sub element, etc. is included. The PN ID sub element indicates the ID of the PN if the PN is already present and the PNE Info sub element indicates information about the PNE belonging to the PN if the PN is already present. The PNE info sub element includes a PNE ID element and a PNE name element.

Meanwhile, after the discovery request message is generated, the gateway transmits the message to devices detected through physical connection. The discovery request message may be transmitted using a broadcast method.

The above-described discovery request is shown in Table 1 below.

TABLE 1

| Element | Description | |
|---|---|---|
| UserInfo | Include UserID and UserName. | |
| | UserID | ID of CPNS user |
| | UserName | Name of CPNS user |
| EntityInfo | This is an abbreviation for entity information and may include the following sub elements: PNEID, PNGWID, Name, Mode, PN Info Req, UI Capa, zone based service support, Broadcast group key delivery support | |
| | PNEID | ID of PNE |
| | PNGWID | ID of PN GW |
| | Name | Name of PNE or PN GW |
| | Mode | This is the mode of the transmitter, has a value of 1 if the PNE performs transmission, has a value of 2 if the PN GW performs transmission, and has a value of 3 if the PNE and the GW operate simultaneously. |
| | PNInfoReq | This is set to true if the PNE transmits a message and PN info is requested. |
| | UICapa | This is set to true if the device which operates as the PNE does not have a user interface and the PN GW performs user interaction. |
| | Zone based service support | This is set to true if the PN GW provides the zone based service. |
| PN Info | This includes information about the PN such that the PNE subscribes to the PN if the transmitter for transmitting the discovery request message is a PN GW and has a PN. This may include PN ID, Description and PNE Info sub elements. | |
| | PNID | ID of PN |
| | Description | Description of the PN |
| | PNE Info | This includes information about PNEs which are members of the PN. This may include PNEID and PNE Name as sub elements. In addition, this may include Device Info as sub elements. |
| | PNEID | ID of PNE |
| | PNEName | Name of PNE |
| | Device Info | This is information about a device and may include a mode element and an inactive mode. |
| | Mode | This may include information about a currently active mode. |
| | Inactive mode | This includes information about an inactive mode. |

Then, as shown in FIG. 7 in detail, the CPNS enabled entity of the first device 110 checks an element for a service, e.g., zone based service support, in the received discovery request message and checks a provided service (S111). If the provided service is desired by the user, the following procedure is performed.

If the CPNS enabled entity of the first device 110 confirms the mode of the counterparty for transmitting the message based on the received message and checks the ID of the counterpart through the entity info element.

8-9) The CPNS enabled entity of the first device 110 checks the states of the PNEs belonging to PN#1 (S112). If there is no PNE which may use the service provided by PN#2 as the result of confirming the states of the PNEs, the CPNS enabled entity of the first device 110 checks the mode thereof (S113). At this time, if there is no PNE which may use the service provided by PN#2, this means that all PNES are located in the coverage of PN#1 but none of the PNEs is located in the coverage of PN#2. Alternatively, this may mean that at least one PNE is located in both the coverage of PN#1 and the coverage of PN#2 but there is no PNE capable of performing communication in PN#2 due to lack of power, power off and communication method mismatch.

At this time, a determination as to whether a PNE which may use the service provided by PN#2 is present as the result of checking the states of the PNEs may be made with reference to Table 2 below.

TABLE 2

| Presence in overlapped region of the coverage of PN#1 and the coverage of PN#2 | Inside the coverage of PN#1 and outside the coverage of PN#2 | Result of decision |
| --- | --- | --- |
| Available PNE is present | PNE is present | Mode change is necessary |
| Available PNE is present | PNE is not present | Change is not necessary |
| Available PNE is not present | PNE is present | Mode change is necessary |
| Available PNE is not present | PNE is not present | Change is not necessary |

10) If the CPNS enabled entity of the first device 110 may operate not only as a gateway but also as a PNE as the result of checking the mode thereof, the PNE is activated (S114).

If the PNE is activated, both the gateway mode and the PNE mode are activated. A mode for simultaneously activating two modes is referred to as a "both mode". Alternatively, a mode for simultaneously activating two modes is referred to as a "combined mode".

11) If the checked mode of the counterparty is a GW, it is determined that the discovery request message is not additionally transmitted and the discovery response message is generated.

At this time, if the CPNS enabled entity of the first device 110 activates not only a gateway but also a PNE, mode information in a discovery response message for the discovery request message, e.g., an entity discovery response message, is set to the both mode or the combined mode and is delivered.

Entity Info element: This is information about the CPNS enabled entity which receives the discovery request and includes a user ID sub element and a user name sub element.

PNE ID element: This includes the ID of the PNE if the CPNS enabled entity which receives the discovery request is a PNE.

PNE Name element: This includes the name of the PNE if the CPNS enabled entity which receives the discovery request is a PNE.

Mode element: This is set to the both mode or the combined mode.

UI Capa element: This has true if the PN GW should perform user interaction instead of the PNE. This is set by the PNE. For example, this may be set to true if the PNE does not have a user interface and thus the PN GW performs user interaction instead.

PN Info element: This element is included if the value of the PN Info Req element is set to True in the received discovery request message. The first device 110 which operates as the PNE includes information about PN#1 which has been established between the first device and the second device 120, if the value of the PN Info Req element is set to True in the received discovery request message. The PN Info element may include a PN ID sub element, a description sub element, etc.

PNE Info element: this includes information about the member of the PN.

The above-described discovery response message is shown in Table 3 below.

TABLE 3

| Element | Description |
| --- | --- |
| UserInfo | Include UserID and UserName. |
| | UserID     ID of user |
| | UserName    Name of user |
| EntityInfo | This is an abbreviation for entity information and may include the following sub elements: PNEID, PNGWID, Name, Mode, PN Info Req and UI Capa |
| | PNEID      ID of PNE |
| | PNGWID    ID of PN GW |
| | Name       Name of PNE or PN GW |
| | Mode        This is the mode of the transmitter for transmitting the discovery response message, has a value of 1 if the PNE performs transmission, has a value of 2 if the PN GW performs transmission, and has a value of 3 if the PNE and the GW operate simultaneously. |
| | UICapa      This is set to true if the device which operates as the PNE does not have a user interface and the PN GW performs user interaction. |
| PN Info | This includes information about the PN such that the PNE subscribes to the PN if the transmitter for transmitting the discovery response message is a PNE and has already participated in another PN. This may include PN ID, Description and PNE Info sub elements. |
| | PNID       ID of PN |
| | Description    Description of the PN |
| | PNE Info    This includes information PNEs which are members of the |

TABLE 3-continued

| Element | Description |
|---------|-------------|
| | PN. This may include PNEID and PNE Name as sub elements. In addition, this may include Device Info as sub elements. |
| PNEID | ID of PNE |
| PNEName | Name of PNE |
| Device Info | This is information about a device and may include a mode element and an inactive mode. |
| Mode | This may include information about a currently active mode. |
| Inactive mode | This includes information about an inactive mode. |

As described above, the third device which confirms that the CPNS enabled entity of the first device 110 operates not only as a gateway but also as a PNE, that is, operates in the both mode or the combined mode, begins a PN#2 establishment procedure in order to allow the first device 100 to subscribe to PN#2. This will be described in detail.

12) The CPNS enabled entity of the third device 210 transmits, for example, a PN setup request message to the first device 110. At this time, the PN setup request message may include information about the gateway and information about entities which will belong to a PN to be generated (e.g., the CPNS enabled entity of the first device).

The PN setup request message is shown in Table 4 below.

13) In the CPNS enabled entity of the first device 110, if the PNE receives the PN setup request message, the PNE checks the origin entity ID element in order to check who desires to generate the PN. A PN ID and a Msg ID element are extracted from the message.

The CPNS enabled entity which operates as the PNE in the first device 110 generates the PN setup response message as follows.

First, the CPNS enabled entity which operates as the PNE includes the response to the PN setup request message in a return element of the PN setup response message. The response is 1 if successful and 2 upon failure. Subsequently, the CPNS enabled entity of the first device 110 includes the

TABLE 4

| Element | Description | |
|---------|-------------|---|
| Origin Entity ID | ID of the CPNS enabled entity which will establish a PN | |
| PN Setup Type | Indicates how the PN is established. 1: The PN GW and the PNE are included in one-to-one correspondence. 2: The PNE establishes a PN with all devices connected to the PN GW. 3: The PN is established with only specific invited PNEs. | |
| Invited PNE ID | Include IDs of PNEs to be invited during PN establishment process | |
| PN Info | This is information about a PN to be registered with and stored in the CPNS server and may include the following elements: PNID, Description, Disclosure, Ownership Entity, PN GW Info, PNE Info | |
| | PNEID | Indicate ID of PNE |
| | Description | Description of the PN (e.g., home, office) |
| | PN GW Info | This is information about PN GW and includes a PNGWID element and a PN GW name element. |
| | PNGWID | ID of PN GW |
| | PN GW Name | Name of PN GW |
| | PNE Info | This is information about the PNE and may include PNEID, PNE Name, Mode, Description, Device Capa and Service Profile elements. |
| | PNE ID | ID of PNE |
| | PNE Name | Name of PNE |
| | Mode | Information about the mode of the PNE |
| | Description | Description of PN |
| | Device Capa | Information about the function of the device including the PNE |
| | Service Profile | Information about the CPNS enabled application or information about content supporting specific service or state |
| Auth IniData | This is information used to begin the PNE authentication procedure and may include authPNEID, rand_PNE and LocalEUKeyAssignment | |
| | AuthPNEID | ID of a target PNE to be authenticationd by the CPNS server |
| | rand_PNE | Random value generated by the PNE |
| | LocalEUKeyAssignment | Flag indicating necessity of LocalEUKey assignment. TRUE: necessary, FALSE: unnecessary |

PN Info element for the PN information in the PN setup response message. Subsequently, the CPNS enabled entity of the first device 110 includes the information about the PNE belonging to the PN in the PNE Info element of the PN setup response message. In addition, several elements are included in the PN setup response message.

The generated message is shown in Table 5 below.

TABLE 5

| Element | | Description |
|---|---|---|
| Return | | Success/failure of PN SETUP Request. 1: OK, 2: failure, the CPNS enabled entity cannot process the request, 3: not allowed |
| PN Info | | This is information about a PN and may include the following elements: PNID, Description, PN GW Info, PNE Info |
| | PNEID | ID of PNE |
| | Description | Description of the PN (e.g., home, office) |
| | PN GW Info | This is information about PN GW and includes PNGWID and PN GW name. |
| | PNGWID | ID of PN GW |
| | PN GW Name | Name of PN GW |
| | PNE Info | This is information about the PNE and may include PNEID, PNE Name, Mode, Description, Device Capa and Service Profile. |
| | PNE ID | ID of PNE |
| | PNE Name | Name of PNE |
| | Mode | Information about the mode of the PNE |
| | Description | Description of PN |
| | Device Capa | Information about the function of the device including the PNE |
| | Service Profile | Information about the CPNS enabled application or information about content supporting specific service or state |
| Auth IniData | | This is information used to begin the PNE authentication procedure and may include authPNEID, rand_PNE and LocalEUKeyAssignment |
| | AuthPNEID | ID of a target PNE to be authenticated by the CPNS server |
| | rand_PNE | Random value generated by the PNE |
| | LocalEUKeyAssignment | Flag indicating necessity of LocalEUKey assignment. TRUE: necessary, FALSE: unnecessary |
| | Auth FinData | This is information used in the PNE in order to authenticate the CPNS and includes HASH. |
| | HASH | Hash value calculated by the target PNE or the PN GW |

If the PN setup response message is completely generated, the CPNS enabled entity of the first device transmits the generated message to the second device 210.

14) When the CPNS enabled entity of the third device 210 receives the PN setup response message, the return element in the received message is checked in order to check whether the first device wishes to participate in the PN. If the value of the return element is set to 1, information about PN inventory for a corresponding PN is generated and a routing table is generated and maintained based on information from the received message.

The CPNS enabled entity of the third device 210 generates the PN setup request message to be transmitted to the CPNS server.

More specifically, the CPNS enabled entity of the third device 210 includes the ID of the PN GW in the OriginEntity element. Information about a PN to be generated is included in the PN Info element of the PN Setup Request message. At this time, the PN Info element includes a PN ID element including the ID of the PN generated by the PN GW and a description element including description of the generated PN. The CPNS enabled entity of the third device 210 includes the PN GW Info element in the PN Setup Request message. At this time, the PN GW Info element includes a PN GW ID element indicating the ID of the PN GW and a PN GW Name element indicating the name of the PN GW. The CPNS enabled entity of the third device 210 includes a PNE Info element and an Auth Ini Data element in the PN Setup Request message.

In particular, the CPNS enabled entity of the third device 210 includes a value indicating that the first device 110 is in the both mode or the combined mode in the mode element of the PNE Info element. That is, as shown in FIG. 6, the PNE ID is set to PNE#0 and mode=both is set in the PNE Info element.

If the message is completely generated, the CPNS enabled entity of the third device 210 transmits the generated PN Setup Request message to the CPNS server 300.

15) When the CPNS server 300 receives the PN Setup Request message from the third device 210, an authentication request message is generated and sent to the first device 110 through the third device 210.

16) The first device 110 transmits the authentication response message to the CPNS server 300 through the third device 210.

If authentication is successful as the result of checking the authentication response message, the CPNS server 300 registers and stores PN information included in the PN Setup Request message in the PN inventory.

17) The CPNS server 300 generates and transmits the PN Setup Response message to the third device 210.

18) The third device 210 receives the PN Setup Response message from the CPNS server and stores the PN information in the local PN inventory. The third device 210 generates and transmits the PN Establishment Notification message to the first device 110.

If PN#2 is completely established through the above procedure, the application server 400 may acquire information about PN#2 from the CPNS server 300 and set the first device 110 or the second device 120 as a destination of service data through the acquired information if service data is present. If the second device 120 is set as the destination of the service data, the application server 400 sends the service data to the third device 210 which operates as the gateway and the third device transmits the service data to the first device 110 which operates as the PNE. The CPNS enabled entity which operates as the PNE in the first device 110 receives the service data and transmits the service data to the internal gateway, and the gateway transmits the service data to the second device 120.

Figure 8:
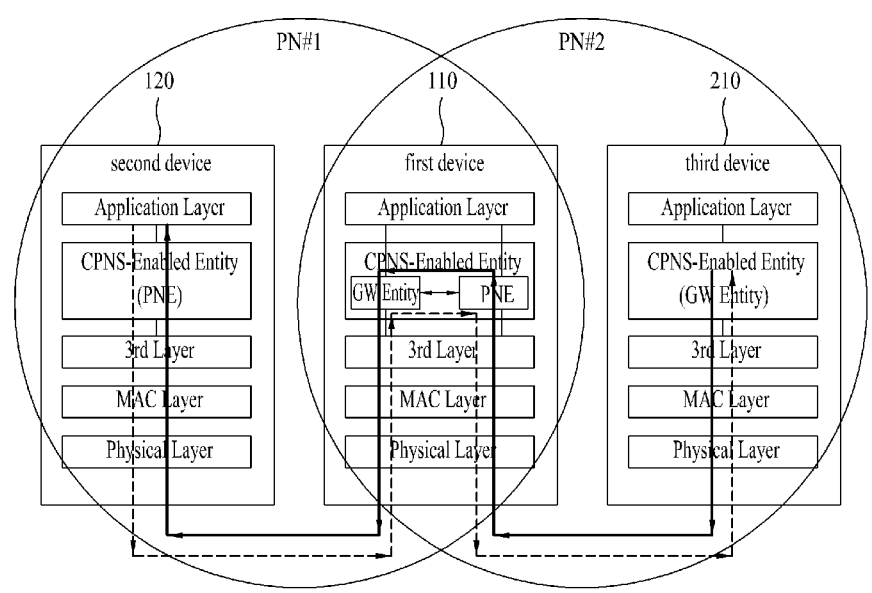
FIG. 8 is a diagram showing architecture after changing a mode.

If the CPNS enabled entity of the first device 110 operates in the both mode, referring to FIG. 8, the gateway and the PNE simultaneously operate in the CPNS enabled entity of the first device 110 and a communication channel is established between the gateway and the PNE. Accordingly, the CPNS enabled entity of the first device 110 functions as the PNE and receives the service data from the third device 210 which operates as the gateway in PN#2 and the CPNS enabled entity of the first device and the CPNS enabled entity of the first device 110 functions as the gateway and transmits the service data to the second device 120 which operates as the PNE in PN#1.

More specifically, referring to FIG. 8, a physical layer, a MAC layer, a third layer and a CPNS enabled entity and an application layer are present in each of the first, second and third devices 110, 120 and 130. At this time, the CPNS enabled entity of the second device 120 operates only the PNE and the CPNS enabled entity of the third device 210 operates only the gateway entity. In contrast, if the CPNS enabled entity of the first device 110 operates both the PNE and the gateway entity if the mode is changed to the both mode or the combined mode. As shown, a communication link is generated between the PNE and the gateway entity in the CPNS enabled entity of the first device 110.

Accordingly, as denoted by a thick solid line of FIG. 8, the service data is sent to the first device 110 through the CPNS enabled entity, the third layer, the MAC layer and the physical layer of the third device 210. When the first device 110 receives the service data, the PNE of the CPNS enabled entity receives the service data through the physical layer, the MAC layer and the third layer and the PNE sends the service data to the gateway entity through the generated communication link. The gateway entity of the CPNS enabled entity of the first device 110 transmits the service data to the second device 120 through the third layer, the MAC layer and the physical layer.

In order to allow the CPNS enabled entity of the first device 110 to function as the PNE to communicate with the third device 210 which operates as the gateway and to function as the gateway to communicate with the second device 120 which operates as the PNE, synchronization needs to be adjusted.

In other words, the CPNS enabled entity of the first device 110 simultaneously communicates with two devices, that is, the third device 210 and the second device 120. However, if synchronization is not performed, communication with any one device may interfere with communication with the other device. For example, the signal transmitted from the third device 210 to the first device 110 may cause interference in the second device 120. Similarly, the signal transmitted from the second device 120 to the first device 110 may cause interference in the third device 210.

In order to avoid interference, synchronization of the communication link between the first device 110 and the second device 120 may be readjusted according to synchronization of the communication link between the third device 210 and the first device 110.

More specifically, synchronization adjustment will be described with reference to FIGS. 9 and 10.

Figure 9:
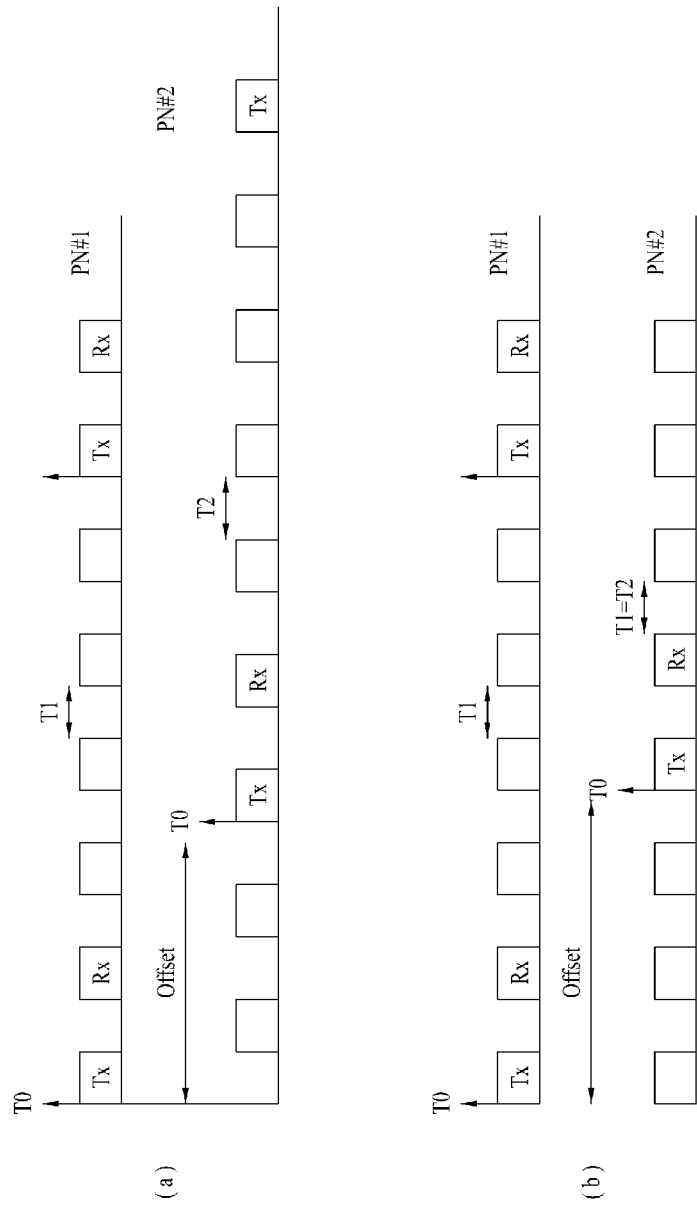
FIG. 9 is a diagram showing an example of adjusting synchronization after a mode of a CPNS enabled entity is changed.

FIG. 9 is a diagram showing an example of adjusting synchronization after a mode of a CPNS enabled entity is changed.

Transmit (Tx) and receive (Rx) cycles in PN#1 composed of the first device 110 and the second device 120 are shown at the upper side of FIG. 9(*a*) and Tx and Rx cycles in PN#2 composed of the first device 110 and the third device 130 is shown at the lower side of FIG. 9(*b*). Referring to FIG. 9(*a*), the idle time T1 of PN#1 may be longer than the idle time T2 of PN#2.

Accordingly, the signal transmitted from the third device 210 to the first device 110 in PN#2 may cause interference in the second device in PN #1.

In order to solve unsynchronization, the first device 110 may measure a start point T0 in the link with the third device 210. In addition, at least one of the Tx period, the Rx period and the idle time between the Tx period and the Rx period of the third device 210 may be measured.

Subsequently, the first device 110 may transmit, to the second device, a control signal for adjusting synchronization with the second device 120 based on at least one of the measurement results. At this time, the control signal may include at least one of the measurement results.

Then, the second device may readjust the synchronization with the first device 110 based on the control signal.

If synchronization readjustment is completed, as shown in FIG. 9(*b*), the lengths of the idle times T1 and T2 may become equal. In addition, the Tx periods and the Rx periods become equal.

Figure 10:
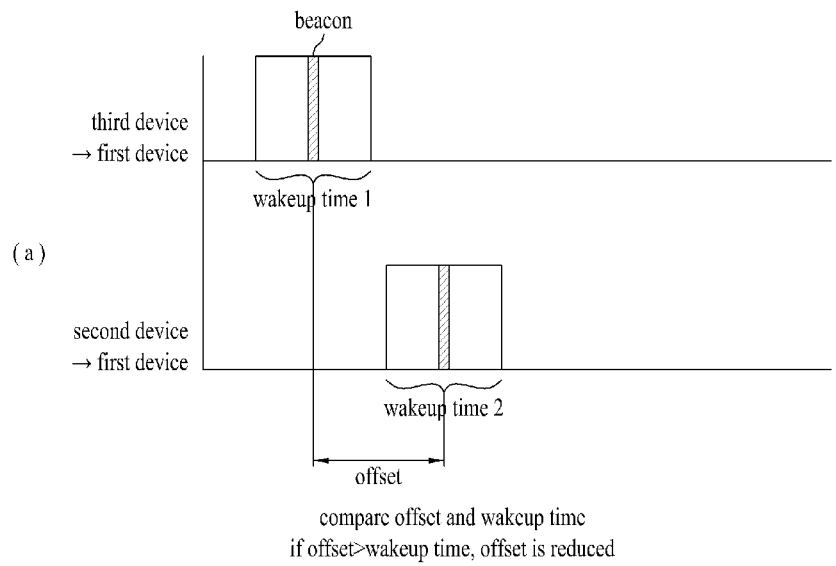
FIG. 10 is a diagram showing another example of adjusting synchronization after a mode of a CPNS enabled entity is changed.
Figure 10:
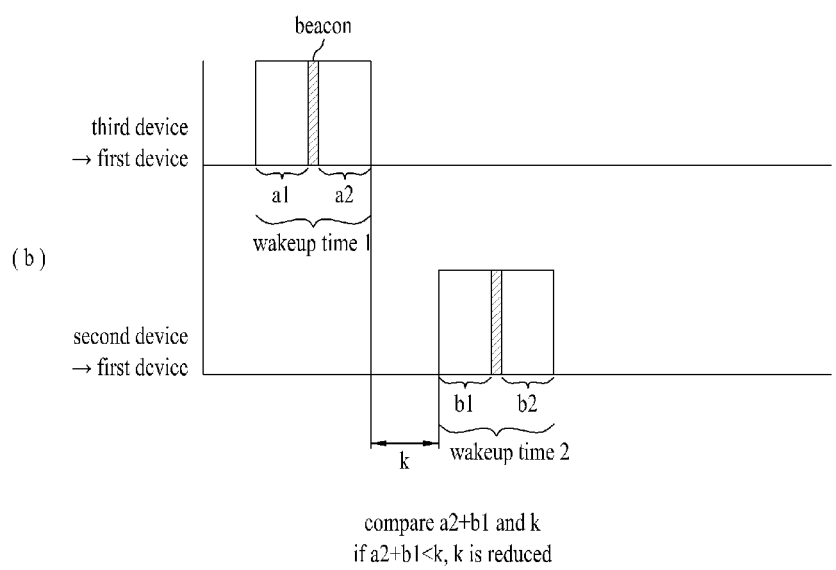

FIG. 10 is a diagram showing another example of adjusting synchronization after a mode of a CPNS enabled entity is changed.

Referring to FIG. 10(*a*), operation for receiving data from the third device 210 at the first device 100 is shown at the upper side of FIG. 10(*a*) and operation for receiving data from the second device 120 at the first device 110 is shown at the lower side of FIG. 10(*a*). At this time, in order to allow the first device 110 to receive a beacon signal from the third device 210, a time for applying power to an internal receiver is denoted by a wakeup time 1. Similarly, in order to allow the first device 110 to receive a beacon signal from the second device 120, a time for applying power to an internal receiver is denoted by a wakeup time 2.

As this time, as shown, the first device should apply power to the receiver during the wakeup time 1 and the wakeup time 2 in order to receive the beacon messages.

Accordingly, if the time for applying power to the receiver is reduced, it is possible to more efficiently use power.

For efficient use of power, an offset between a time when the first device 110 receives the beacon signal from the third device 210 and a time when the first device receives the beacon signal from the second device 210 is compared with the wakeup time 1. If the offset is greater than the wakeup time 1, it is possible to reduce the offset. In order to reduce the offset, the first device 110 may transmit the control signal to the second device 120.

As shown in FIG. 10(*b*), assume that a time for applying power to the internal receiver in order to allow the first device 110 to receive the beacon signal from the third device 210 is the wakeup time 1, a time before receiving the beacon message in the wakeup time 1 is a1, and a time after receiving the beacon message is a2. In addition, assume that a time for applying power to the internal receiver in order to allow the first device 110 to receive the beacon signal from the second device 120 is the wakeup time 2, a time before receiving the beacon message in the wakeup time 2 is b1, a time after receiving the beacon message is b2. In addition, assume that a time offset between the wakeup time 1 and the wakeup time 2 is K.

The first device 110 compares the time a2+b1 with the time k and reduces k if a2+b1<k. In order to reduce k, the first device 110 may transmit the control signal to the second device 120.

The above-described embodiments and modified examples may be combined. Accordingly, the respective embodiments may be achieved by combination thereof when necessary rather than implemented alone. Those skilled in the art can easily implement such combination and, therefore, a detailed description of such combination will not be given. Nonetheless, such combination is not excluded from the present invention and should be interpreted as being included in the scope of the present invention.

The above embodiments and modified examples may be achieved by various means, for example, hardware, firmware, software, or a combination thereof.

In a hardware configuration, the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and executed by a processor. The memory unit is located at the interior or exterior of the processor and may transmit data to and receive data from the processor via various known means.

For example, the methods according to the present invention may be stored in a storage medium (e.g. an internal memory, a flash memory, a hard disk, etc.) or may be implemented as code or commands within a software program which can be executed by a processor (e.g. a microprocessor). The will be described with reference to FIG. 13.

Figure 11:
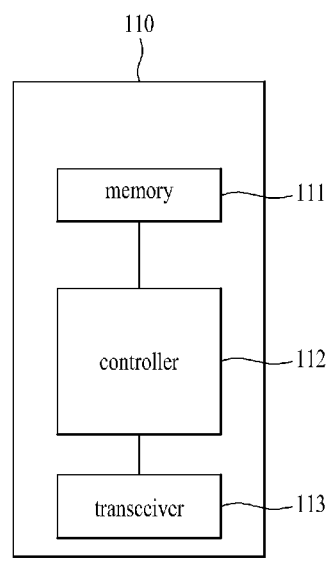
FIG. 11 is a block diagram showing the configuration of a device according to embodiments of the present invention.

FIG. 11 is a block diagram showing the configuration of a device according to the embodiments of the present invention.

As shown in FIG. 11, the device 110 includes a memory 111, a controller 112, and a transceiver 101.

The memory 111 stores the methods shown in FIG. 2 to FIG. 10.

The controller 112 controls the memory 111 and the transceiver 113. Specifically, the controller 112 performs the methods stored in the memory 111. The controller 112 transmits the above-described signals through the transceiver 113.

The exemplary embodiments described hereinabove are combinations of elements and features of the present invention. The elements or features should be considered selective unless explicitly mentioned otherwise. Each element or feature may be practiced without being combined with other elements or features. Further, an embodiment of the present invention may be constructed by combining parts of the elements and/or features. Operation orders described in the embodiments of the present invention may be rearranged. Some constructions or features of any one embodiment may be included in another embodiment and may be replaced with corresponding constructions or features of another embodiment. It will be obvious that claims that are not explicitly cited in the appended claims may be presented in combination as an exemplary embodiment of the present invention or included as a new claim by subsequent amendment after the application is filed.

The present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention. Further, claims which are not explicitly dependent on each other can be combined to provide an embodiment or new claims can be added through amendment after this application is filed.

The invention claimed is:

1. A method of communicating with a second device by a first device including a converged personal network service (CPNS) enabled entity, the method comprising:
   determining whether a mode of the CPNS enabled entity needs to be changed from a gateway mode to a combined mode;
   changing the mode of the CPNS enabled entity from the gateway mode to the combined mode according to a result of determining;
   operating the CPNS enabled entity in a personal network entity (PNE) mode to receive service data of a second network from the second device and operating the CPNS enabled entity in the gateway mode to transmit the received service data to at least one entity belonging to a first network managed by the CPNS enabled entity, according to change to the combined mode;
   comparing an offset time, between a signal received on a link with the second device and a signal transmitted and received on a link with the at least one entity, to a wakeup time for receiving the signal on the link with the second device; and
   when the offset time is greater than the wakeup time, controlling synchronization between the CPNS enabled entity operating in the gateway mode and the at least one entity, in consideration of synchronization between the CPNS enabled entity operating in the PNE mode and the second device,
   wherein the mode of the CPNS enabled entity is changed from the gateway mode to the combined mode when at least one entity belonging to a first network managed by the CPNS enabled entity is within a coverage of a second network, but cannot directly receive the service from the second device.

2. The method according to claim 1, further comprising comparing an offset between a start point of a frame received from the second device and a start point of a frame transmitted by the CPNS enabled entity.

3. The method according to claim 1, further comprising:
   comparing an idle time in a link with the second device and an idle time in a link with at least one entity,
   wherein the controlling synchronization is performed if the idle times mismatch.

4. The method according to claim 1, further comprising, when the offset time is greater than the wakeup time, transmitting, to the at least one entity, a control signal for reducing the offset time.

5. The method according to claim 1, further comprising:
   comparing a time a2+b1 and a time k, where a2 is a wakeup time after receiving the signal on the link with the second device, b1 is a wakeup time before receiving the signal on the link with the at least one entity, and k is a time after the time a2 is completed and before the time b1 is started,
   wherein the controlling synchronization is performed if $a2+b1<k$.

6. The method according to claim 1, wherein a communication channel is established with the CPNS enabled entity operating in the gateway mode in consideration of synchronization between the CPNS enabled entity operating in the PNE mode and the second device.

7. The method according to claim 1, wherein the determining is further based on whether at least one entity belonging to the first network managed by the CPNS enabled entity needs to receive a service of the second network from the second device, but is outside the coverage of the second network.

8. The method according to claim 1, wherein the mode is changed to the combined mode when the at least one entity belonging to the first network managed by the CPNS enabled entity is outside the coverage of the second network or is within the coverage of the second network, but cannot directly receive a service of the second device.

9. The method according to claim 1, wherein the determining includes determining that the mode is not changed when some of all PNEs belonging to the first network are not within the coverage of the second network, but at least the remaining PNEs which will use a service of the second network among all the PNEs are within the coverage of the second network.

10. The method according to claim 1, further comprising receiving a discovery request message including information about the mode of the second device from the second device if the CPNS enabled entity set in the gateway mode is moved into the coverage of the second network managed by the second device.

11. The method according to claim 10, further comprising:
transmitting a discovery response message in response to reception of the discovery request message,
wherein the discovery response message includes mode information indicating that the CPNS enabled entity operates in the combined mode.

12. A device, comprising:
a memory configured to store a converged personal network service (CPNS) enabled entity set in a gateway mode, the CPNS enabled entity set in the gateway mode managing a first network and at least one entity capable of receiving a first service through the CPNS enabled entity set in the gateway mode being present within the first network;
a controller configured to:
determine whether a mode of the CPNS enabled entity needs to be changed from the gateway mode to a combined mode;
operate both a gateway and a personal network entity (PNE) in order to change the mode of the CPNS enabled entity from the gateway mode to the combined mode according to a result of determining;
compare an offset time, between a signal received on a link with the second device and a signal transmitted and received on a link with the at least one entity, to a wakeup time for receiving the signal on the link with the second device; and
when the offset time is greater than the wakeup time, control synchronization between the CPNS enabled entity operating in the gateway mode and the at least one entity, in consideration of synchronization between the CPNS enabled entity operating in the PNE mode and a second device; and
a transceiver configured to receive service data of a second network from the second device using the PNE operated by the controller and transmit the received service data to at least one entity belonging to the first network managed by the CPNS enabled entity using the operated gateway,
wherein the controller is further configured to change the mode of the CPNS enabled entity from the gateway mode to the combined mode when the at least one entity belonging to the first network managed by the CPNS enabled entity is within a coverage of the second network, but cannot directly receive the service from the second device.

13. The device according to claim 12, wherein the controller compares an offset between a start point of a frame received from the second device and a start point of a frame transmitted by the CPNS enabled entity.

14. The device according to claim 12, wherein:
the controller is further configured to compare an idle time in a link with the second device and an idle time in a link with at least one entity; and
if the idle times mismatch, the mode is changed to the combined mode.

15. The device according to claim 12, wherein:
the controller is further configured to compare a time $a2+b1$ and a time k, where $a2$ is a wakeup time after receiving the signal on the link with the second device, $b1$ is a wakeup time before receiving the signal on the link with the at least one entity, and k is a time after the time $a2$ is completed and before the time $b1$ is started; and
the controller is further configured to change the mode to the combined mode if $a2+b1<k$.

* * * * *